H. DUNBAR.
DEVICE FOR RECORDING AND LOCATING IRREGULARITIES IN ROAD SURFACES.
APPLICATION FILED APR. 21, 1917.

1,264,495.

Patented Apr. 30, 1918.

INVENTOR
Harley Dunbar,
BY
Frederick W. Cameron
ATTORNEY

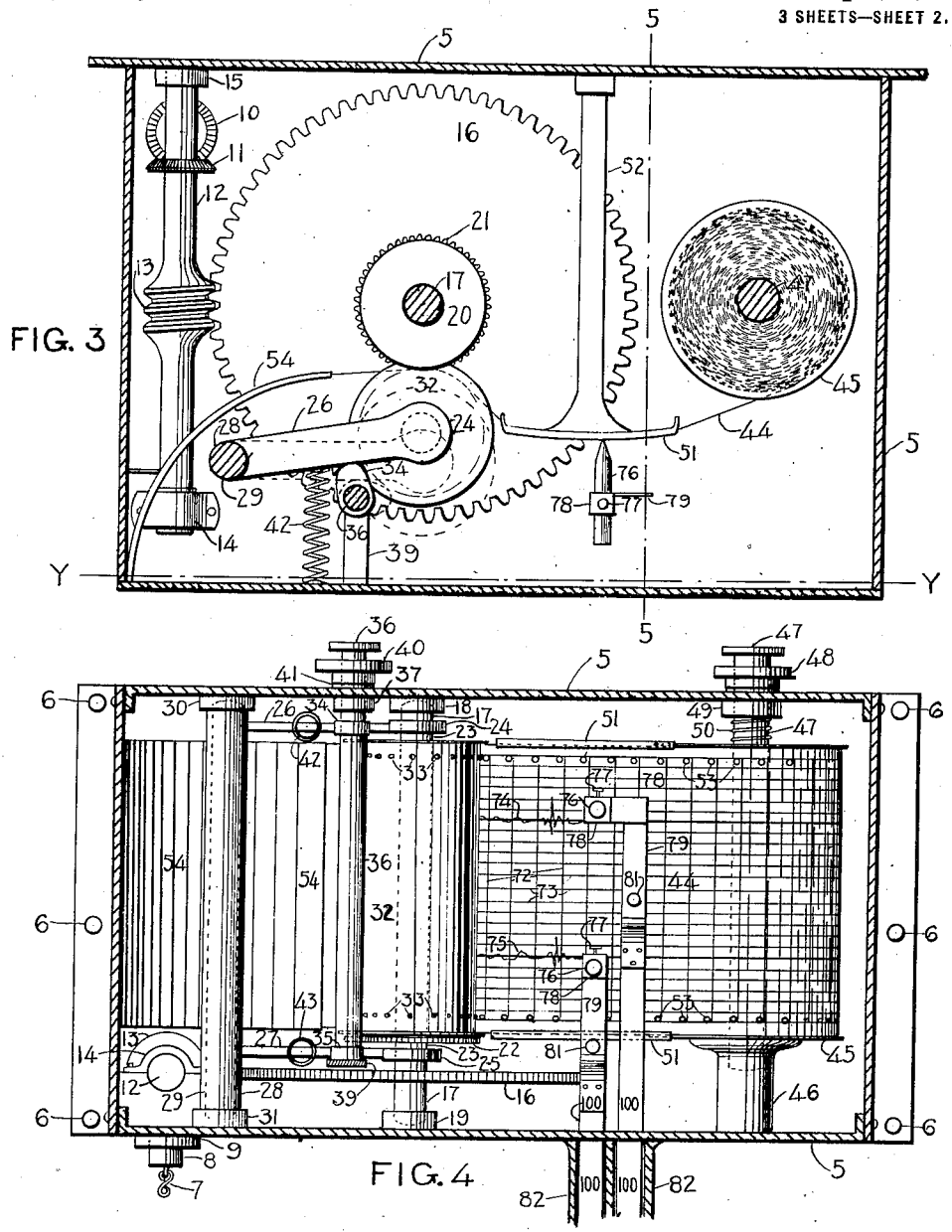

H. DUNBAR.
DEVICE FOR RECORDING AND LOCATING IRREGULARITIES IN ROAD SURFACES.
APPLICATION FILED APR. 21, 1917.
1,264,495.
Patented Apr. 30, 1918.
3 SHEETS—SHEET 3.
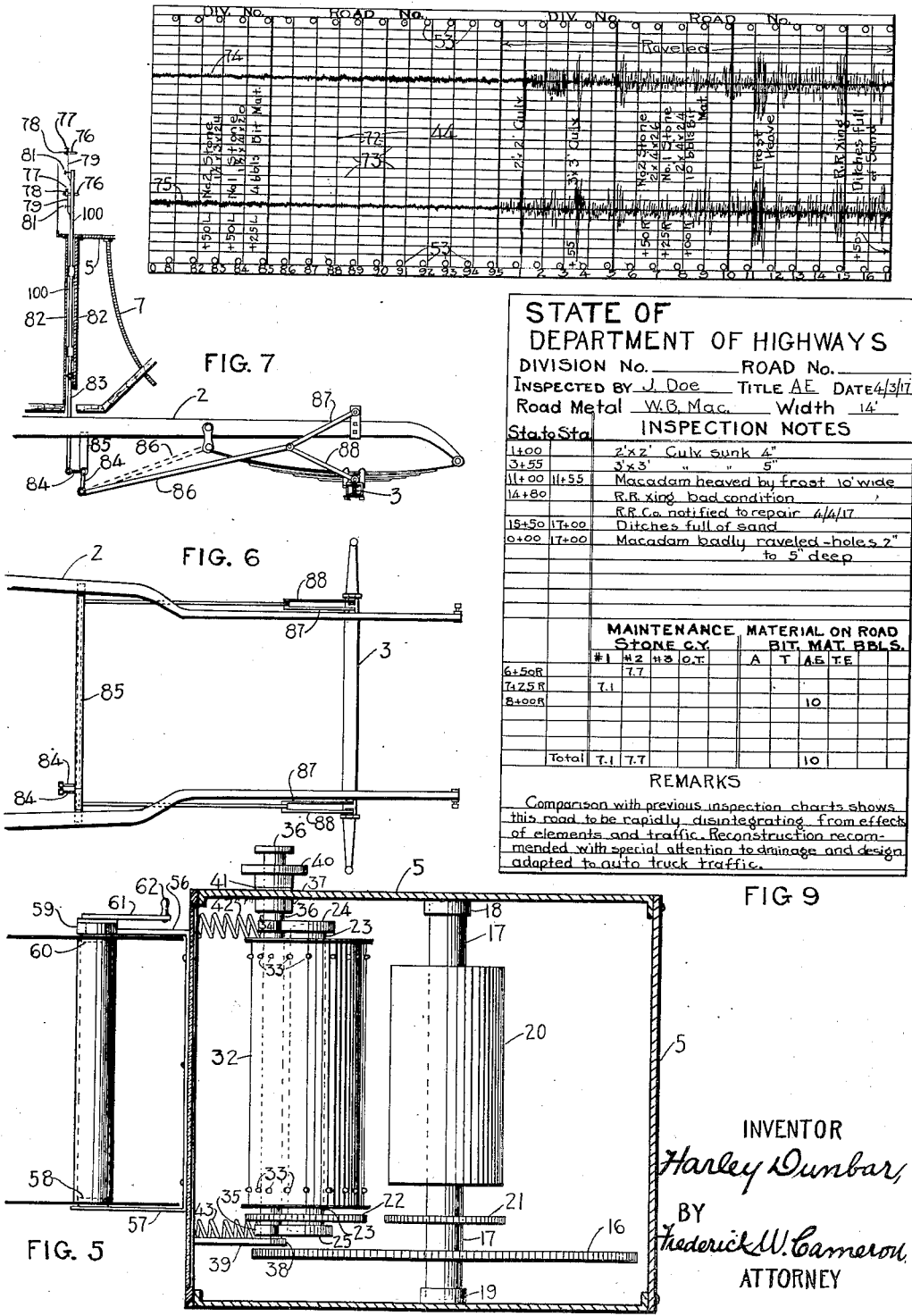

UNITED STATES PATENT OFFICE.

HARLEY DUNBAR, OF PLATTSBURG, NEW YORK.

DEVICE FOR RECORDING AND LOCATING IRREGULARITIES IN ROAD-SURFACES.

1,264,495. Specification of Letters Patent. Patented Apr. 30, 1918.

Application filed April 21, 1917. Serial No. 163,601.

*To all whom it may concern:*

Be it known that I, HARLEY DUNBAR, a citizen of the United States of America, residing at the city of Plattsburg, in the county of Clinton and State of New York, have invented certain new and useful Improvements in Devices for Recording and Locating Irregularities in Road-Surfaces, of which the following is a specification.

My invention relates to apparatus for detecting, recording and locating irregularities or inequalities in surfaces of roads improved or unimproved, and has particular reference to means to be applied to moving vehicles, such, for example, as motor cars, for the purpose of indicating on a band of paper at a determined scale and in fixed mutual relation at all points the undulations, sharp changes in grade, and irregularities in the surfaces of roads.

The invention is designed to produce a graphical record of the conditions of road surfaces and to show at a glance to those engaged in the construction and maintenance of highways the exact conditions of the road surfaces inspected. My invention is also designed to assist road construction engineers to obtain a smoother riding surface than would otherwise be obtained, and to assist road maintenance engineers to maintain highways in their charge to a higher degree of excellence in a manner more methodical and at less cost than was possible before the use of my invention.

The graphical record of the condition of roads taken by my invention at stated periods of time, say weekly, monthly or yearly, will form a history of the conditions of road surfaces and indicate by comparison with previous charts the progress and quality of work done during construction and the efforts made to maintain roads already constructed.

From information taken from my invention, data may be compiled in compact form and placed in the hands of an executive official showing him at a glance the exact condition of all the roads under his jurisdiction.

In general my invention consists of a compact metal box attached to the instrument board of an automobile on the right-hand side of same if the car be left-hand drive, and on the left-hand side if it be a right-hand driven car. If the instrument board is so constructed as to forbid of my invention being attached thereto, it may be attached by means of a bracket to either upright body post usually situated just back of and to the right or left of the instrument board. Motion in mutual relation to speed of car is transmitted to mechanism, hereinafter described and contained in a metal box, by means of a flexible shaft and gears connecting the hub of either front road wheel or by means of a flexible shaft and gears to the transmission shaft of an automobile. Unless arrangements are specially made with the manufacturers of the different automobiles it is more practical at this time to connect with the hub of the front road wheel as shown in the drawings, but right is reserved to connect with the transmission if desired.

My invention consists also of one or more recording pencils or pens operating on a band of paper within the above described box and connected to either front or rear axle or spring shackle bolt of car by means of sundry arms and levers hereinafter described in detail.

In the accompanying drawings:

Fig. 3 is a horizontal section of the indicator box taken just below the top plate thereof, along the line, X—X, on Fig. 1.

Fig. 4 is a vertical section of the indicator box taken just back of the front plate thereof, along the line, Y—Y, on Fig. 3.

Fig. 5 is a cross section of the indicator box taken on line, 5—5, shown in Fig. 3, and shows especially the position of the rollers hereinafter described when the machine is not in operation.

Fig. 6 shows a top view or plan of apparatus connecting my indicator box with front axle of motor car.

Fig. 7 is a side elevation of the apparatus shown in Fig. 6.

Fig. 8 is a chart produced by my invention and also shows notations made by the operator at the time road was inspected.

Fig. 9 is a tabulation of information contained on inspection chart compiled for use of an executive official.

Similar characters refer to similar parts throughout the several views.

Figure 1:
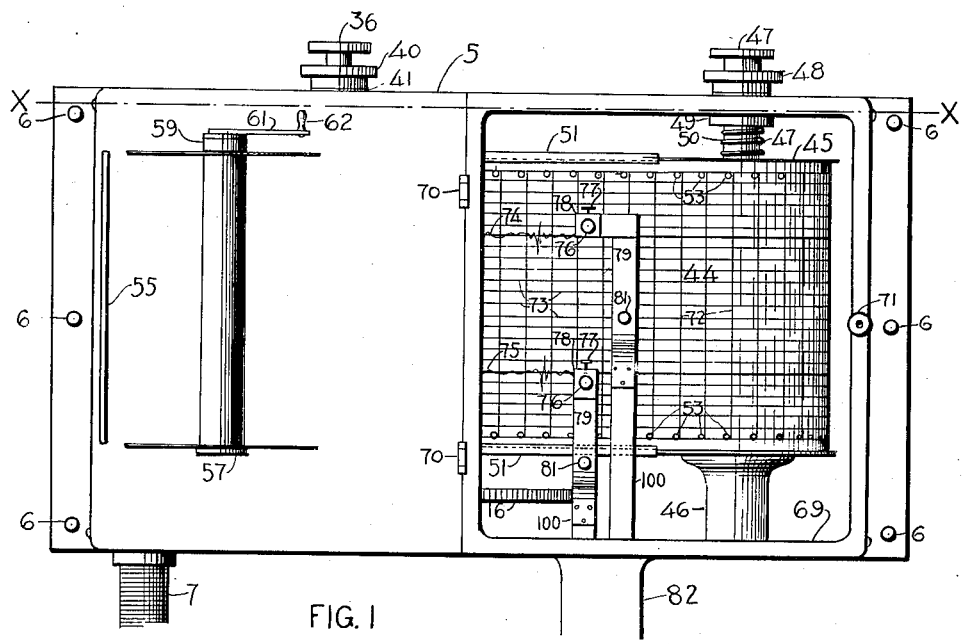
Figure 1 is a front view of a recording apparatus embodying and adapted to the practice of my invention.
Figure 2:
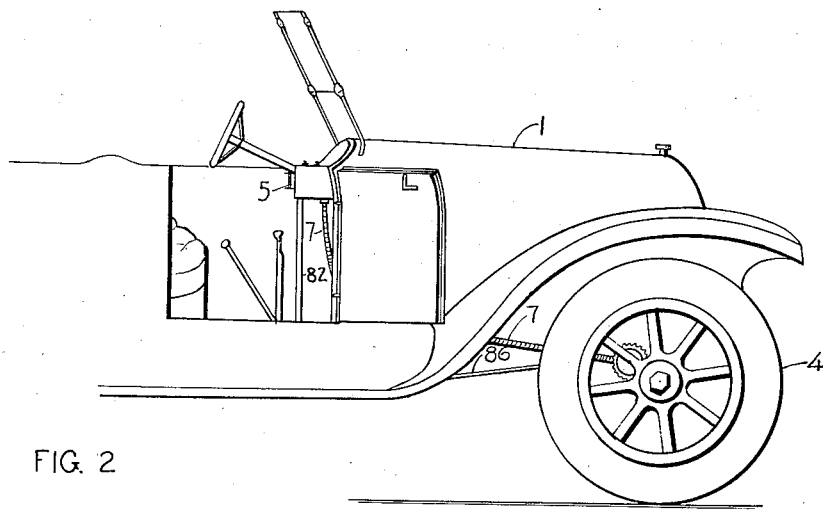
Fig. 2 is a side elevation of a conventionally-represented motor vehicle with my road indicator attachment applied thereto.

In the practice of my invention the indicator box and mechanism within are the same for all makes of motor vehicles, but connection between the indicator box and the axle of cars and between the indicator box and gears on the front wheels or transmission necessarily varies in length and size to fit various makes of motor cars.

To the end of affording those skilled in the art of constructing and maintaining highways the information necessary to the practice of my invention, I shall proceed to describe the methods I employ and the construction and mode of operation of the sundry mechanical constructions and devices by which they may be carried out premising that I do not confine myself in all particulars to the specific mechanism hereinafter described, as various modifications in its detail may be made without departing from the spirit of my invention. The description relates to the instance in which conditions of road surfaces are automatically detected and recorded.

Referring to the drawings:

Numeral 1, indicates in a conventional manner an automobile to which my invention has been applied, 2, being the frame of chassis; 3, the front axle; 4, the front wheel of car; 5, the metal box comprising the rectangular frame shown in Figs. 1, 2, 3, 4, 5 and 7 and embodying the recording mechanism of my invention.

The location of the indicator box in modern cars is on the right-hand side on or near the instrument board. It is attached to the instrument board or in any suitable manner. I illustrate one way which is by means of extension of the rear plate of the frame of the box which is provided with the holes, 6, for the insertion of small bolts.

Motion in fixed mutual relation to the speed of the car and distances covered by the same is transmitted to the recording apparatus contained within the box, 5, by means of a flexible shaft, 7, geared either to the hub of the front wheel, 4, preferably on the same side of the car as the recording apparatus is situated, or to the transmission, not shown. The flexible shaft, 7, is attached to the vertical shaft, 8, journaled in the bottom plate of the box, 5, in the bearing, 9, (see Fig. 4.) The bevel gear, 10, is keyed to the vertical shaft, 8, (see Fig. 3), and meshes with the bevel gear, 11, keyed to the horizontal worm shaft, 12, to which is keyed the worm, 13. The worm shaft, 12, is journaled in a pedestal bearing, 14, supported by the bottom plate of the box, 5, and in the bearing, 15, in the back plate of box, 5. The worm, 13, meshes with the worm wheel, 16, keyed to the vertical shaft, 17, supported in the bearings, 18 and 19, in the top and bottom plates of the box, 5. On the shaft, 17, is keyed a cylindrical roller, 20, and a spur gear, 21. The spur gear, 21, meshes with a similar spur gear, 22, which is keyed to a vertical shaft, 23, journaled in the bearings, 24 and 25. The bearings, 24 and 25, are supported by horizontal arms, 26 and 27, attached to the vertical hollow shaft, 28, which revolves around the vertical axle, 29, (see Fig. 4), the ends of which are journaled in the bearings, 30 and 31, supported by the top and bottom plates of the box, 5. On the vertical shaft, 23, is keyed another cylindrical roller, 32, (see Fig. 3), which when the apparatus is in operation presses closely against the roller, 20. Near the upper and lower extremities of the roller, 32, are provided several projecting teeth, 33, spaced exactly the same distance from each other, the use of which will be explained hereinafter. The roller, 32, is held snugly against the roller, 20, by the two cams, 34 and 35, pressing against the respective horizontal arms, 26 and 27, shown in Figs. 3 and 4. The cams, 34 and 35, are attached to the vertical shaft, 36, supported in the bearings, 37 and 38, the bearing, 37, being supported by the upper plate of the box 5, and the bearing, 38, supported by the horizontal arm, 39, attached to the front plate of the box, 5. The vertical shaft, 36, extends through the upper plate of the box, 5, as shown in Figs. 1, 4 and 5. The circular nut, 40, is threaded on the vertical shaft, 36, allowing it to be loosened or tightened at will. When tightened it presses down on the lock washer, 41, which in turn presses against the upper plate of the box, 5, and holds the shaft, 36, with its attached cams in any desired position. By loosening the nut, 40, and turning the shaft, 36, to the right, the cams, 34 and 35, are turned with the shaft, allowing the springs 42 and 43, which connect the horizontal arms, 26 and 27, with the front side of the box, 5, to pull, the roller, 32, away from the roller, 20, thus allowing for the easy insertion of a band of paper, 44, between the rollers or to stop the operation of the recording apparatus at will.

The band of paper, 44, is first wound upon a cylinder or spool, 45, and the spool is placed on a standard, 46, said standard also forms a bearing for the vertical axle, 47, which extends through the core of spool and is removable by loosening the circular nut, 48, threaded on the axle, 47. The axle can then be drawn upward through the core of the spool and the upper plate of the box, 5. The axle, 47, passes through the bearing, 49, and between this bearing and the upper end of the spool a spring, 50, (Fig. 4), is placed, which exerts a slight pressure on the spool and prevents it revolving faster than necessary, and also tends to keep the band of paper taut as it is drawn through the roller. The band of paper as it leaves the spool passes over a vertical table, 51, fitted with guards on its upper and lower edges to guide the paper on its course. The table is supported by the arm, 52, attached to the back plate of the box, 5. The paper next passes between the rollers, 20 and 32, the roller, 32, being fitted with the projecting teeth, 33, which fit in the circular holes, 53, in the band of paper, the holes being the same distance apart as the teeth on the roller. This prevents any tendency of the paper to slip while passing through the roller and insures same moving with proportionate rate of speed of that of the car. The paper next enters the curved guide box, 54, which ends in a slot, 55, (see Fig. 1), from which the paper is expelled from the box, 5. On the front side of the box, 5, at the same elevation and to the right of the slot, 55, I have provided a means for receiving the bands of paper as it emerges from the slot, thus preventing it being whipped and torn by the wind, but at the same time allowing the operator to examine the chart and make notes if he so desires. I will describe this in detail, as follows: (see Figs. 1 and 5):

Two brackets or arms, 56 and 57, project at right angles from the front plate of the box, 5, arm, 57, being so constructed as to allow its being sprung downward far enough to insert a spool similar to spool, 45, between the two arms; also a knob, 58, on the top face of the arm, 57, fits snugly in the core, but not so closely as to prevent easy revolving of the spool. The upper arm, 56, is fitted with the bearing, 59, supporting a short downward projecting arm, 60, so shaped as to fit into the slot on the inner surface of the core of the spool. To arm, 60, is attached a horizontal arm or crank, 61, fitted with a small handle, 62. By turning the crank, 61, the spool is turned with it and a band of paper may be wound on the spool at the will of the operator.

As the band of paper, 44, passes over the table, 51, each recording pencil, 76, inscribes on it an irregular line as shown in Figs. 1, 4 and 8, each line being a graphical indication of the condition of the surface of road passed over by the vehicle to which my invention is attached. The recording pencil, 76, is attached by means of the arms and levers hereinafter described to the front or rear axle of the car and to the front or rear portion of the frame of the car over the axle or to the shackle bolts of certain types of automobile springs.

I do not limit myself to the connection of my device to the front portion of the vehicle.

The recording pencil, 76, is held by means of a thumb screw, 77, in position in a small metal block, 78, attached to a flat spring, 79, which is attached to a vertical shaft, 100, and adjusted by means of a thumb screw, 81, as shown in Fig. 7, allowing a gentle pressure to be exerted by the pencil on the band of paper. The vertical shaft, 100, extends downward through the bottom plate of the box, 5, within its casing, 82, said casing acting not only as a protection but as a guide allowing the shaft to move in a vertical direction only. The lower end of the vertical arm, 100, is connected by a link, 83, to the upper arm of a double-armed lever, 84, pivoted on a cross bar, 85, attached to the frame, 2, of the chassis. The arms of lever, 84, are at right angles to each other. The lower arm of lever, 84, is connected by a link, 86, to two short arms, 87 and 88, which in turn are pivoted to the frame of the chassis above the axle and to the axle, 3, respectively.

The operation of the above described mechanism is as follows:

As the wheels of the vehicle pass over irregularities of the road the axle of same has a vertical as well as a horizontal motion. This vertical motion being transformed to a horizontal motion at the extremities of the arms, 87 and 88, causes the link, 86, to transmit this motion or vibration horizontally to the lower arm of the double-armed lever, 84, which causes the upper arm to transmit the same motion in a modified form to the link, 83, and to the vertical shaft, 100, which in turn causes the recording pencil or pen, 76, to inscribe on the band of paper the vertical motion transmitted to it.

Another simple method of transmitting vibrations or road shocks from the front axle is to connect the lower arm of the double-armed lever, 84, with the shorter link, 86, shown by dotted lines in Fig. 7, to the lower shackle bolt of the springs. Of course, this method applies only to the type of springs shown in the drawings.

On the right and front side of metal box, 5, is a door, 69 secured to the box, 5, by the hinges, 70, and the screw clasp, 71, and fitted with transparent material such as glass through which the operator may see the recording pencils, 76, and note the graphical record being made by them. This also affords means to insert new spool of paper, make notes on the chart while in operation, adjust the pencils, etc.

If at any time during the inspection of a road it is desired to stop my invention from recording, all that it is necessary to do is to loosen the nut, 40, and turn the shaft, 36, to the right. This allows the springs, 42 and 43, to pull the gears, 22, out of mesh with the gear, 21, and roller, 32, out of contact with the roller 20, assuming the position shown in Fig. 5, thus stopping the band of paper, 41, from being drawn through the roller. When the machine is desired to be placed in operation again the shaft, 36, may be turned to the left, thus causing the cams, 34 and 35, to push the rollers together with the desired pressure; gears, 21 and 22, will remesh and on tightening the nut, 40, the machine is ready for work.

In Fig. 8, I have shown a chart produced by my invention. On the bottom line of this chart is shown a series of figures, each figure representing a hundred feet of road known among engineers as stations. Stations of 100 feet are also ruled off by the vertical lines, 72. The horizontal lines, 73, are so spaced as to measure the vertical deflection of the wheels of the vehicle as recorded by the recording pencils. The irregular lines, 74 and 75, are those inscribed by the recording pencils, the upper one representing the right-hand side of the road, and the lower the left-hand side of the road as traversed by the right and left wheels of the vehicle. The lines, 74 and 75, between the stations, 80 and 95, indicate a smooth riding road in good condition but containing many slight undulations; between stations, 95 (0+00) and 17 indicate a rough riding road in poor condition with holes two inches to five inches deep. By means of this chart all irregularities and undulations passed over by the vehicle are recorded and located without further efforts on the part of the engineer in charge, and also as he is making his inspection he may jot down directly on the chart the cause of such irregularities and any other notes as to shoulders, ditches, etc., that he may care to make.

On Fig. 9, I have shown a tabulation of information contained on the chart and produced by my invention. By means of this tabulation an executive official having under his general charge hundreds or thousands of miles of roads or streets is enabled to classify the condition of each and every road or street in his territory, know the material on hand for maintaining the same, and the recommendations of his engineers as to the care of the road in the future.

The continued use of my invention by engineers engaged in the construction and maintenance of roads will stimulate the gathering of statistics on which to base calculations for future road work, will point out the relative defects or improvements in different kinds of road construction and form a basis of comparison between different classes of roads as to their qualifications under varying conditions of traffic.

By inserting a clause in the specifications under which roads are built, that they must conform to a certain degree of smooth riding quality as indicated by my invention, will stimulate the contractor to build a better road than he otherwise would before the use of my invention.

Beside the purpose for which my invention may be used by highway engineers, I contemplate using it by connecting recording apparatus with the rear axle of a vehicle (by similar means as shown in the accompanying drawings showing connection with the front axle), to show the vibrations transmitted to the rear axle by the power plant propelling the vehicle. This may be done by running the vehicle on a perfectly smooth pavement.

In the foregoing description I have set forth the application of the principles of my invention in what I deem to be the best and most favorable embodiment thereof to practical use. Numerous structural variations are, however, possible within the scope of the invention which will readily suggest themselves to skilful constructors.

What I claim as my invention and desire to secure by Letters Patent is:

1. In a device for recording and locating irregularities in road surfaces, an automobile; a box attached to the instrument board thereof; a roll of paper mounted in said box upon which the irregularities are to be recorded; two tension rollers between which said paper is adapted to pass and by the operation of which movement is given to the paper; means for adjustably mounting one of said tension rollers in relation to the other, and when desired to break connection between said tension rollers; means for imparting motion to one of said tension rollers corresponding to and determined by the movement of the automobile, comprising a flexible shaft extending from the axle of the automobile and connecting with a worm shaft in the box; a worm shaft mounted in the box; means for operating one of said tension rollers by the movement of said worm shaft; a pencil with its point resting against the paper within the box; a standard to which said pencil is attached; and a series of levers connecting one of the axles of the automobile with the pencil standard, causing the pencil to be moved vertically and to mark on the paper whenever the automobile wheel is raised or lowered in its movement along the surface of the road.

2. Means for detecting and recording irregularities in the surface of a road, comprising a vehicle; a box attached to the vehicle; a bell crank lever attached to a projection from the body of the vehicle; a rod connecting one arm of said lever to the body of the vehicle adjacent to and above the axle; an arm extending from said rod to the axle; the other arm of said bell crank lever attached to a pencil holder; a pencil holder extending into said box; a pencil carried by said holder within said box; a flexible shaft connected with the hub of one of the wheels of the vehicle adapted to impart motion corresponding to the rapidity of the wheels; a roll of paper mounted in said box; tension rollers between which said paper is adapted to pass; means operated by said flexible shaft for imparting motion to one of said tension rollers; a series of pins on the said tension roller to which motion is applied, said pins adapted to engage with a series of holes through the paper; means for moving said tension roller so as to connect with the other of said tension rollers; a table in said box over which said paper passes, said pencil resting against the paper as the paper passes over the table, so arranged and connected up that the paper engaging the pins is moved away from the roller upon which it was wound at a speed corresponding to that of the movement of the vehicle, and the vertical movement of the vehicle is indicated by marks on the paper made by the pencil, substantially as described.

3. Means for detecting and recording the irregularities in the surface of a road, comprising a vehicle; a box placed thereon; a shaft mounted in said vehicle; means for moving said shaft in relation to the speed of the movement of the vehicle; a shaft carrying a gear wheel, a tension roller and a spur gear, said shaft set in motion by said first mentioned shaft; a pair of arms mounted in said box; a roller and gear carried by said arms; a series of pins mounted on said roller adapted to engage the holes along the edges of the paper; said gear adapted to engage said spur gear; cams mounted in said box adapted to engage said arms and by the operation of which said arms may be raised and bring the roller carried by them in contact with the roller having the gear; springs connected with said arms and with the box, the resiliency of which is in opposition to the action of the cams, so that when the cams are moved away from the arms the springs will draw the arms and therefore the roller carrying them away from the other tension roller; a roll of paper mounted in the box, said paper provided with a series of holes along the edges equally spaced, adapted to engage said pins; a curved guide box for said paper after it has passed between said rollers; a reciprocating pencil with its point resting against the paper; and means connected with said pencil and with the axle of the vehicle whereby a vertical movement of the axle will cause a corresponding movement of the point of the pencil, substantially as described.

4. Means for automatically detecting and recording the conditions of road surfaces, comprising a roll of paper; a box in which it is mounted; a vehicle to which the box is secured; a roller mounted in said box; means for imparting a rotary motion to said roller in mutual relation to that of the vehicle; a tension roller in said box; said paper adapted to pass between said rollers; means for adjustably mounting in relation to each other the roller between which the paper passes, which means is adapted to be operated, when desired, to break connection between the said rollers; a pencil mounted to reciprocate in said box in contact with said paper; and means connected with said pencil adapted to transmit the vertical movement of the axle of the vehicle to the pencil, substantially as described.

5. Means for detecting and recording the irregularities in the surface of a road, comprising a vehicle; a roll of paper mounted in the vehicle upon which the irregularities are to be recorded; means for moving the paper corresponding to and determined by the movement of the automobile; a pencil with its point resting against the paper; a standard to which the pencil is attached; and a series of levers connecting one of the axles of the automobile to the pencil standard causing the pencil to be moved vertically and to mark on the paper whenever the automobile wheel is raised or lowered in its movement along the surface of the road.

6. Means for detecting and recording the irregularities in the surface of a road, comprising a vehicle; a roll of paper mounted therein upon which the irregularities are to be recorded; a pencil with its point resting against the paper; a standard to which said pencil is attached; a series of levers connecting one of the axles of the automobile with the pencil standard, causing the pencil to be moved vertically and to mark on the paper whenever the automobile wheel is raised or lowered in its movement along the surface of the road; tension rollers between which said paper is adapted to pass; and means for imparting motion to one of said tension rollers.

In testimony whereof I have affixed my signature in the presence of two witnesses.

HARLEY DUNBAR.

Witnesses:
A. S. MIRICK,
W. A. CHILDS.